C. W. GLIDDEN.

Lasting Machine.

No. 8,557. Reissued Jan. 28, 1879.

Witnesses.
L. F. Connor.
N. E. Whitney.

Inventor.
Charles W. Glidden,
by Crosby & Gregory,
Attys

THE NORRIS PETERS CO., WASHINGTON, D. C.

C. W. GLIDDEN.
Lasting Machine.

No. 8,557. Reissued Jan. 28, 1879.

Witnesses.
L. F. Connor.
N. E. Whitney.

Inventor.
Charles W. Glidden.
by Crosby & Gregory, Attys.

THE NORRIS PETERS CO., WASHINGTON, D. C.

5 Sheets—Sheet 3.

C. W. GLIDDEN.

Lasting Machine.

No. 8,557. Reissued Jan. 28, 1879.

Witnesses

L. F. Connor.

N. E. Whitney.

Inventor.

Charles W. Glidden;

by Crosby & Gregory,

Attys.

THE NORRIS PETERS CO., WASHINGTON, D. C.

C. W. GLIDDEN.

Lasting Machine.

No. 8,557. Reissued Jan. 28, 1879.

Witnesses.
L. F. Connor.
N. E. Whitney.

Inventor.
Charles W. Glidden;
by Crosby & Gregory Attys

THE NORRIS PETERS CO., WASHINGTON, D. C.

C. W. GLIDDEN.

Lasting Machine.

No. 8,557. Reissued Jan. 28, 1879.

Witnesses.

L. F. Connor.

N. E. Whitney.

Inventor.

Charles W. Glidden by Crosby & Gregory

Attys

THE NORRIS PETERS CO., WASHINGTON, D. C.

UNITED STATES PATENT OFFICE.

CHARLES W. GLIDDEN, OF LYNN, MASSACHUSETTS.

IMPROVEMENT IN LASTING-MACHINES.

Specification forming part of Letters Patent No. 135,111, dated January 21, 1873; Reissue No. 8,557, dated January 28, 1879; application filed December 2, 1878.

*To all whom it may concern:*

Be it known that I, CHARLES W. GLIDDEN, of Lynn, in the county of Essex and State of Massachusetts, have invented certain Improvements in Lasting-Machines; and I do hereby declare that the following, taken in connection with the drawings which accompany and form part of this specification, is a description of my invention sufficient to enable those skilled in the art to practice it.

In my invention I combine with a jack that supports the last and upper a carriage carrying a series of lasting devices made as slides, said series being extended around the last just above the plane of the top surface thereof, and each slide having a capability of inward radial movement that will cause its inner end to press the edge of the upper over upon the top of the last, and strain or draw the upper tightly as it so pushes it over. Each slide has a pin extending through an inclined slot in a radius-bar, and the radius-bars are operated by a ring that has a slight rotative movement, and as the ring is turned in one direction all the slides are thereby pressed inward, so as to press the edges of the upper over upon the surface of the inner sole on top of the last, drawing and straining all parts thereof equally.

The drawings represent a machine embodying the invention.

Figure 3:
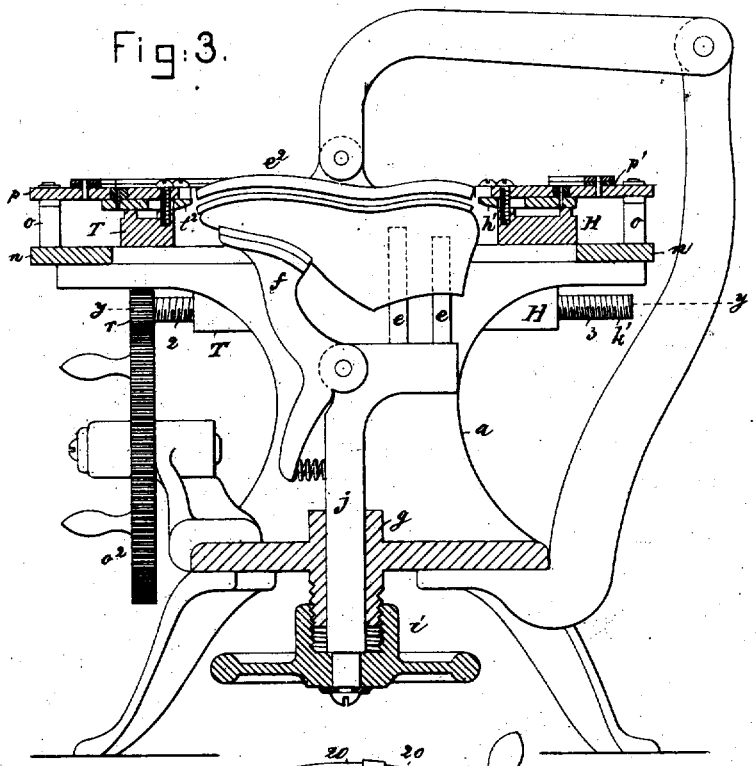
Figure 1:
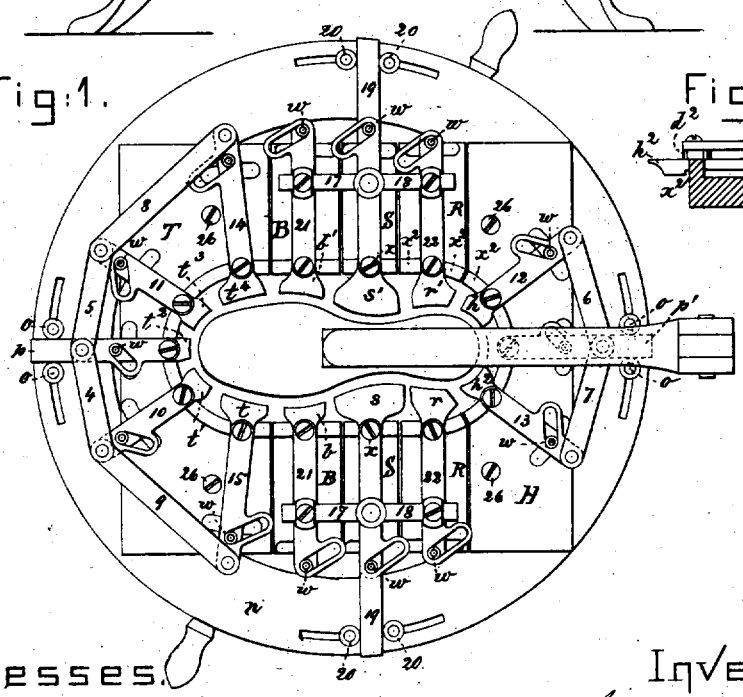
Figure 4:
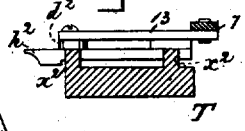
Figure 2:
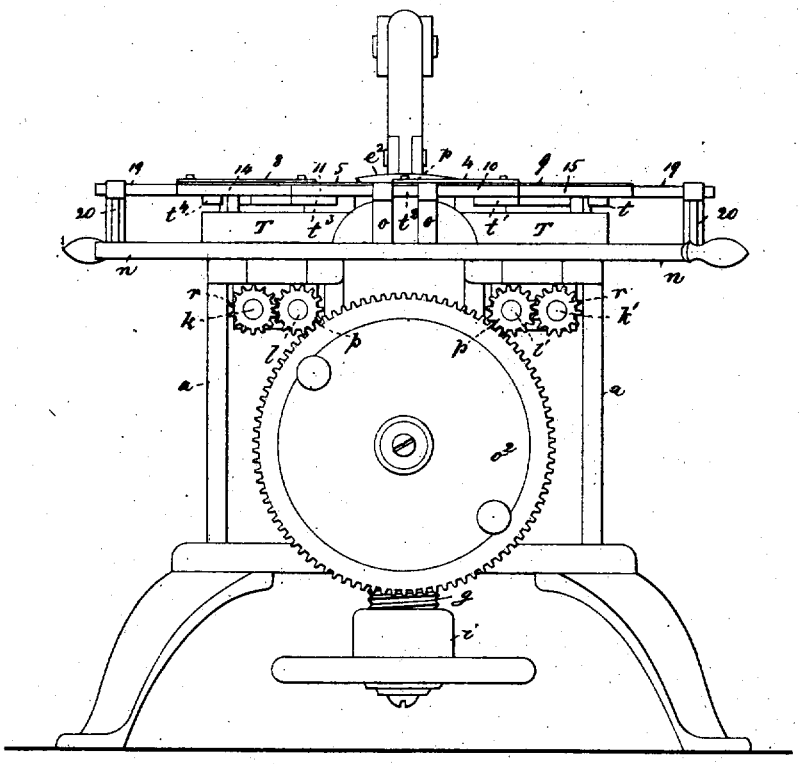
Figure 5:
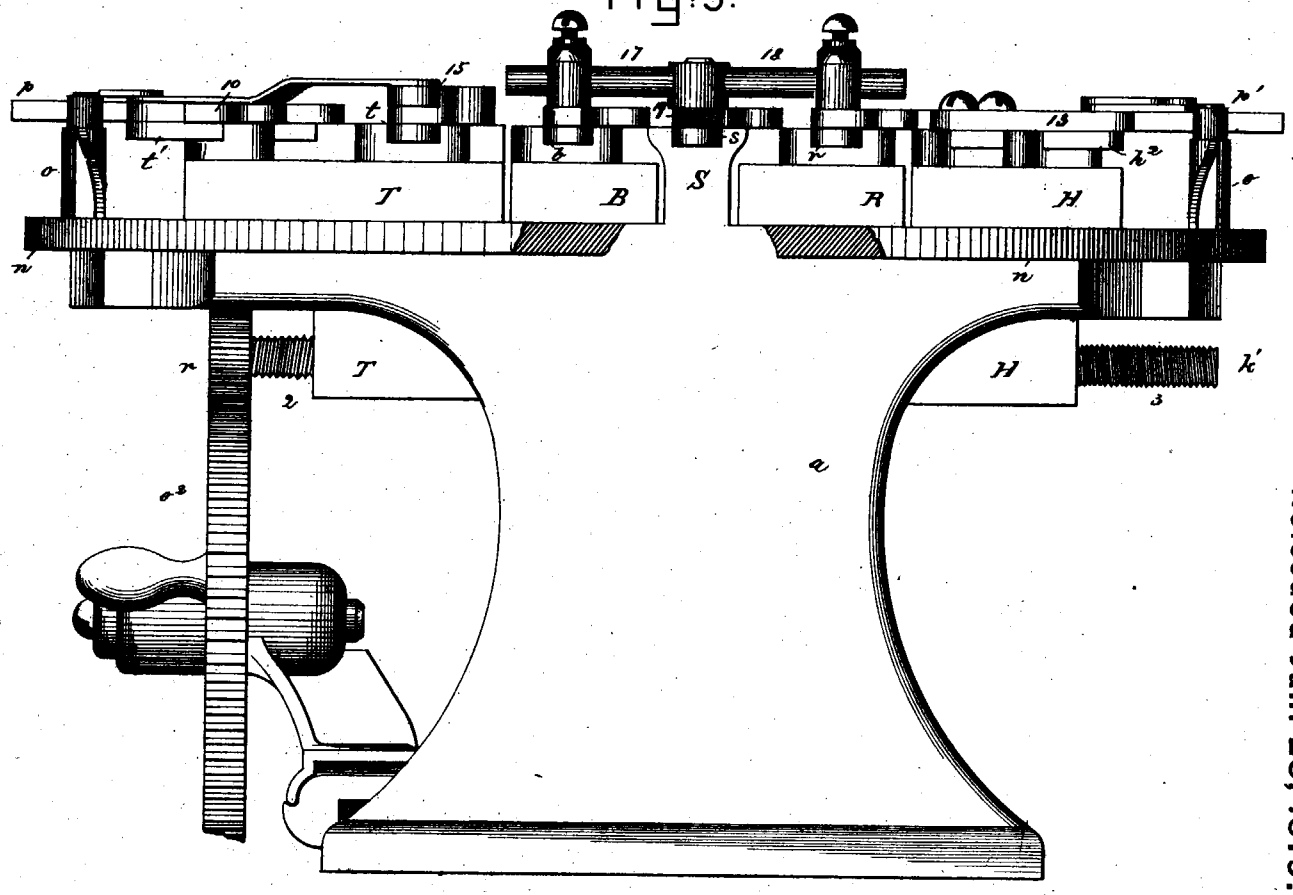
Figure 6:
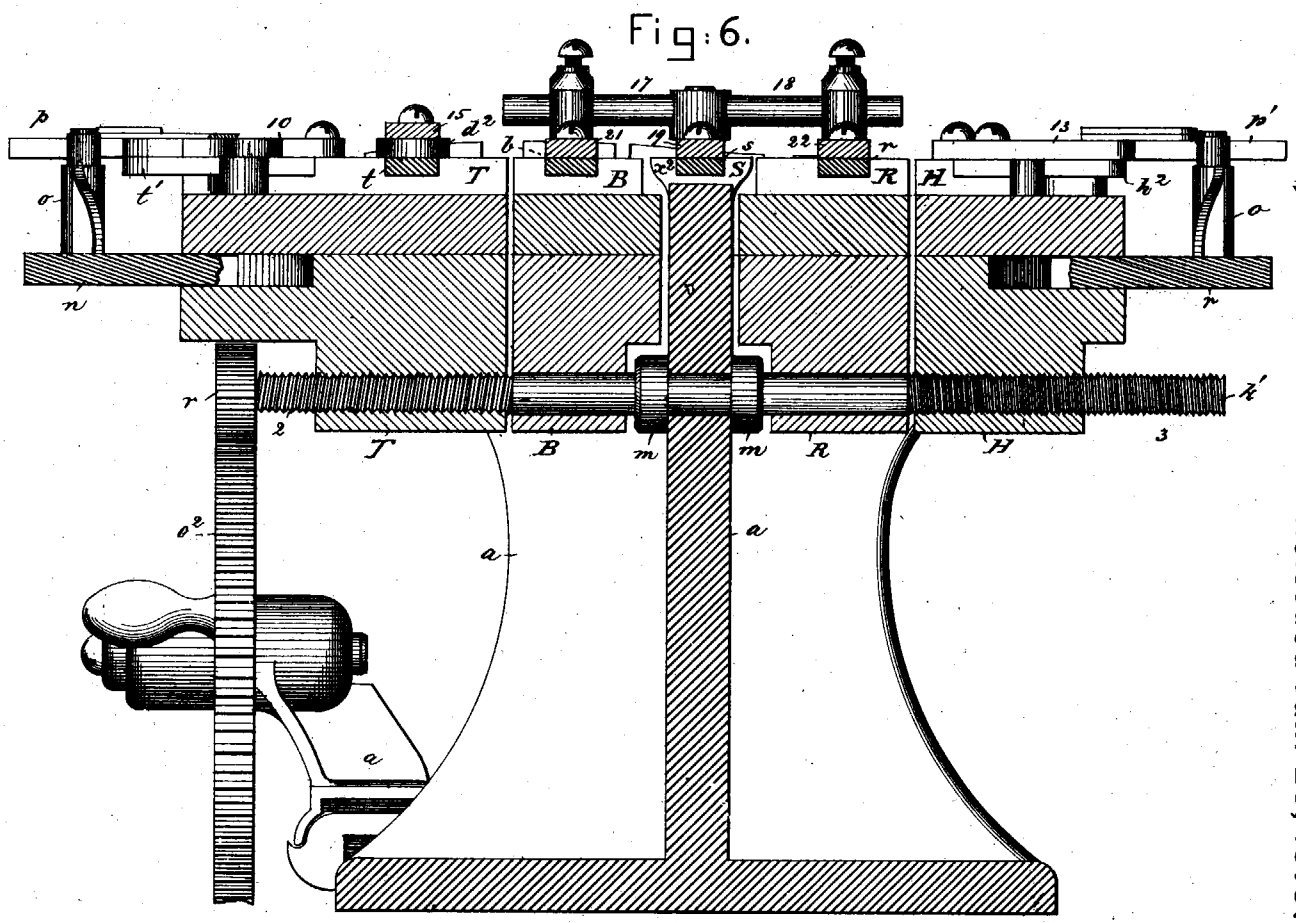
Figure 7:
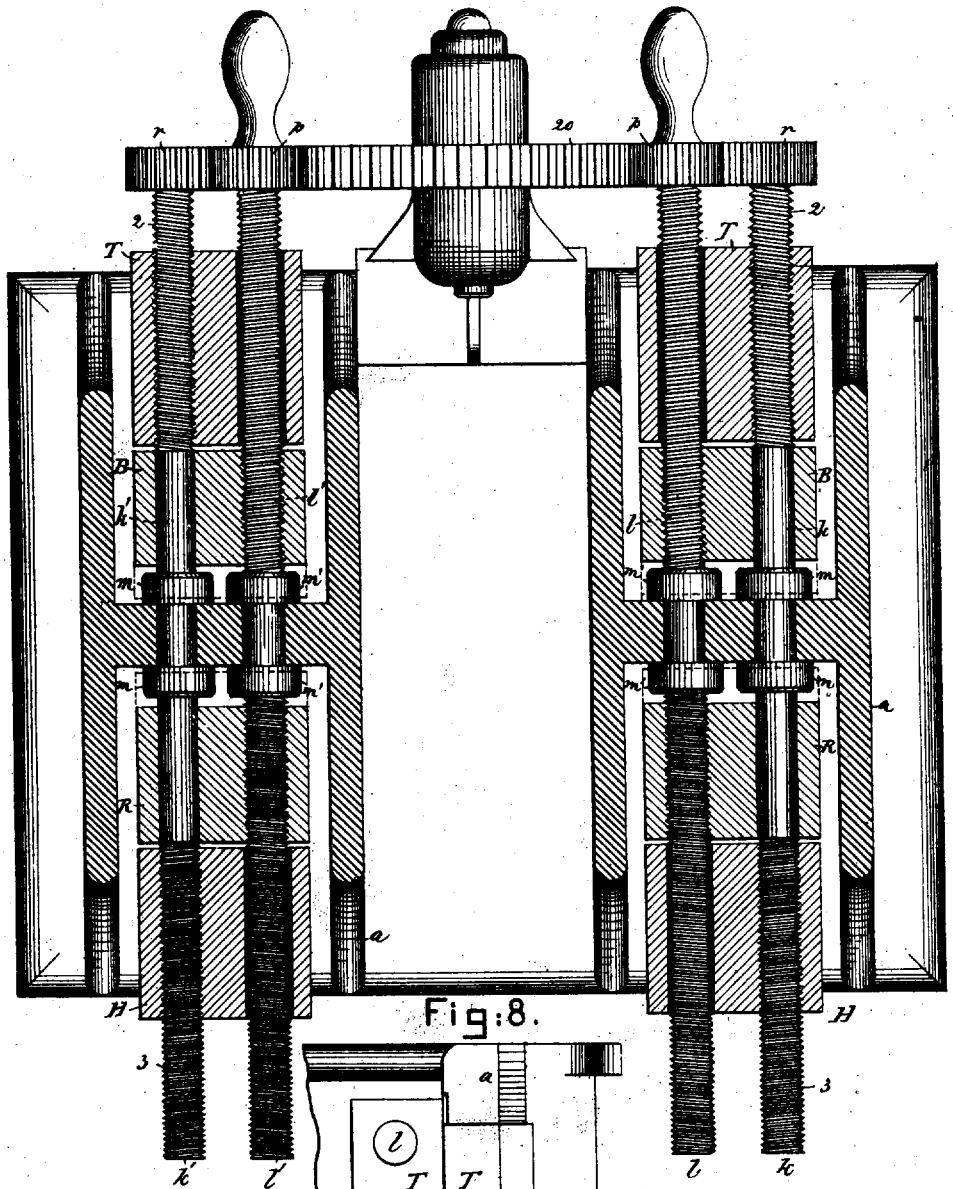
Figure 8:
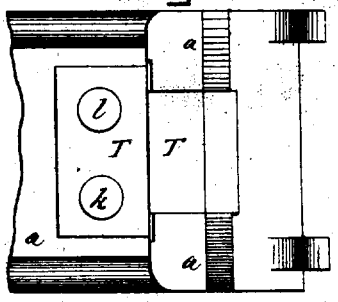

Figure 1 shows the machine in plan. Fig. 2 is a front elevation of it. Fig. 3 is a sectional elevation. Fig. 4 is a sectional detail of one of the lasting-slides. Fig. 5 is a side elevation on a larger scale, the ring for moving the lasting devices being broken away and shown in section; Fig. 6, a vertical longitudinal section taken through the machine on the line of the screw *k*, it being shown in elevation. Fig. 7 is a horizontal section on the line *y y*, Fig. 3; and Fig. 8 is a partial end view showing the carriage T fitted to the screws and held in guideways of the main frame.

The frame-work *a*, of proper form to sustain the working parts, has a spindle, *j*, provided at its top with one or more last-pins, *e e*, to support the last at its heel part, and with a rest, *f*, for the front part of the last. This spindle, extended through a bearing hub or sleeve, *g*, has placed upon it an adjusting device, shown as a hand-operated nut, *i*, fitted to screw-threads at the lower end of the said sleeve, the nut permitting the last-supporting devices to be raised or lowered to place them at the proper level with reference to the closing-in movement of the heel and toe lasting devices.

To crowd the edges of the upper over upon the inner sole laid upon the bottom of the last, I employ a number of slides or fingers, which are moved horizontally over the edge of the last toward its center. To enable the said slides or closing-in devices to be distinguished the one from the other, I herein denominate those which operate upon the edge of the upper at the extreme end of the heel as the "heel-lasting" devices, and I have lettered them $h$ $h^1$ $h^2$; those which operate upon the toe as the "toe-lasting" devices, and they are lettered $t$ $t^1$ $t^2$ $t^3$ $t^4$; those which operate upon the upper at the center of the shank are lettered $s$ $s'$, and denominated "shank-lasting" devices, and they are fixed with relation to the shank at least in one direction, for, unlike all the other lasting devices, they have no movement horizontally with relation to the length of the last from toe to heel, but always remain at the same position—viz., at the shank—and all the other lasting devices are moved horizontally toward and from them in the direction of the length of the last, to adapt the devices to operate upon lasts of different lengths. The ball-lasting devices $b$ $b'$ operate upon the edge of the upper between the shank and toe of the last, and the rear-part devices, $r$ $r'$, operate upon the upper outside the last, between the shank and heel lasting devices.

The toe-lasting devices are all mounted upon a carriage, T, the heel-lasting devices upon a carriage, H, the shank-lasting devices on a fixed portion, S, of the frame, the ball-lasting devices upon a carriage, B, and the rear-part lasting devices on a carriage, R, all except S, as herein shown, having screw-threaded downwardly-extending portions fitted to slide in or on a portion of frame *a*, and provided with screw-threaded holes, (see Figs. 6, 7,) which receive screws $k$ $l$ $k'$ $l'$, held, as herein shown, by collars $m$ $m'$ in fixed portions of frame *a*, just below the fixed projections S, upon which are mounted the shank-lasting devices.

The screws $k$ $k'$ are what are called "differcrowd the upper over upon the inner sole upon the last.

5. In a lasting-machine, shank-lasting devices fixed as to their longitudinal position with relation to the last, combined with heel and ball lasting carriages made movable in the direction of the length of the last, and heel and ball lasting devices also made movable with relation to the length of the last, and from the edge of the last over the inner sole upon the last to crowd the edges of the upper over upon the bottom of the inner sole, substantially as described.

6. In a lasting-machine, shank-lasting devices, adapted to operate upon the edges of the upper at the shank of the last, combined with toe and ball lasting devices mounted upon independent carriages made longitudinally movable with relation to the length of the last, to adapt the mechanism to lasts of different lengths.

7. In a lasting-machine, shank-lasting devices to operate upon the edges of the upper at the shank of the last, combined with heel and rear-part lasting devices mounted upon independently-movable carriages made longitudinally movable with relation to the length of the last, and with mechanism to move the heel-lasting devices horizontally over the inner sole upon the last, substantially as described.

8. In a lasting-machine, heel and toe lasting devices adapted to be movable horizontally over the last-bottom and turn the edges of the upper over upon the inner sole, combined with differential screws to simultaneously move the carriage which carries the toe-lasting devices faster than the carriage which carries the heel-lasting devices, to accommodate the mechanism to lasts of different length.

9. In a lasting-machine, a right and left hand screw moved in unison each with the other, and combined with and moving the heel and toe carriages and their lasting devices simultaneously toward and from the ends of the last, substantially as described.

10. In a lasting-machine, a last-holding pin and shank-lasting devices fixed in position with relation to each other and with reference to the length of the last, combined with heel and toe lasting-devices supported upon independent carriages, and with screws to simultaneously move the two carriages, the carriage carrying the toe-lasting devices being moved the farthest in the same space of time, substantially as described.

11. In combination with the pressers $r$ and bars $y$, springs $d^2$, against the stress of which the pressers may yield vertically, substantially as described.

12. In a lasting-machine, ball and rear-part lasting slides or plates on separate carriages, adapted to be moved longitudinally with relation to the length of last, combined and loosely connected with the devices which move the said lasting slides or plates horizontally over the bottom of the last and inner sole thereon, to permit the said devices to actuate the ball and rear-part lasting slides in all positions of their carriages when adjusted for lasts of different lengths, substantially as described.

In testimony whereof I have hereunto set my hand and seal this 23d day of November, A. D. 1878.

CHARLES W. GLIDDEN. [L. S.]

Witnesses:
G. W. GREGORY,
N. E. WHITNEY.